United States Patent
Polyakov (10) Patent No.: US 9,842,352 B2
(45) Date of Patent: Dec. 12, 2017

(54) HIGH CHURN BUSINESS RING

(71) Applicant: DELONACO LIMITED, Nicosia (CY)

(72) Inventor: Maxym Polyakov, Menlo Park, CA (US)

(73) Assignee: DELONACO LIMITED, Nicosia (CY)

(*) Notice: Subject to any disclaimer, the term of this patent is extended or adjusted under 35 U.S.C. 154(b) by 54 days.

(21) Appl. No.: 13/774,834

(22) Filed: Feb. 22, 2013

(65) Prior Publication Data

US 2014/0244381 A1 Aug. 28, 2014

(51) Int. Cl.
*G06Q 30/02* (2012.01)
*G06Q 10/10* (2012.01)

(52) U.S. Cl.
CPC ....... *G06Q 30/0269* (2013.01); *G06Q 10/101* (2013.01); *G06Q 30/0282* (2013.01)

(58) Field of Classification Search
CPC ............. G06Q 30/0269; G06Q 10/101; G06Q 30/0282
USPC ................ 705/40, 14.46; 709/204
See application file for complete search history.

(56) References Cited

U.S. PATENT DOCUMENTS

| | | | | |
|---|---|---|---|---|
| 8,694,531 B1* | 4/2014 | Stearns | ............ | G06F 17/30761 707/732 |
| 2003/0065525 A1* | 4/2003 | Giacchetti | ............ | A45D 44/005 705/1.1 |
| 2006/0179111 A1* | 8/2006 | Verona | .................. | G06Q 10/10 709/204 |
| 2008/0040267 A1* | 2/2008 | Krishnamoorthy | .. | G06Q 20/102 705/40 |
| 2009/0264100 A1* | 10/2009 | Sapir | ...................... | H04L 51/24 455/411 |
| 2009/0307234 A1* | 12/2009 | Zrike | .................... | G06Q 10/107 |
| 2011/0055309 A1* | 3/2011 | Gibor | .................... | G06O 30/02 709/202 |
| 2011/0137776 A1* | 6/2011 | Goad | .................. | G06Q 20/102 705/34 |

OTHER PUBLICATIONS

Daniel_20070033064_NPL.*

* cited by examiner

*Primary Examiner* — James M Detweiler
*Assistant Examiner* — Tarek Elchanti
(74) *Attorney, Agent, or Firm* — Georgiy L. Khayet (57) ABSTRACT

An online system for managing multiple types of online sites for a company is disclosed. Such an online system is designed to retain user interest in the company.

14 Claims, 9 Drawing Sheets

HIGH CHURN BUSINESS RING

TECHNICAL FIELD

The present invention is directed to online businesses such as dating systems.

BACKGROUND

Figure 1:
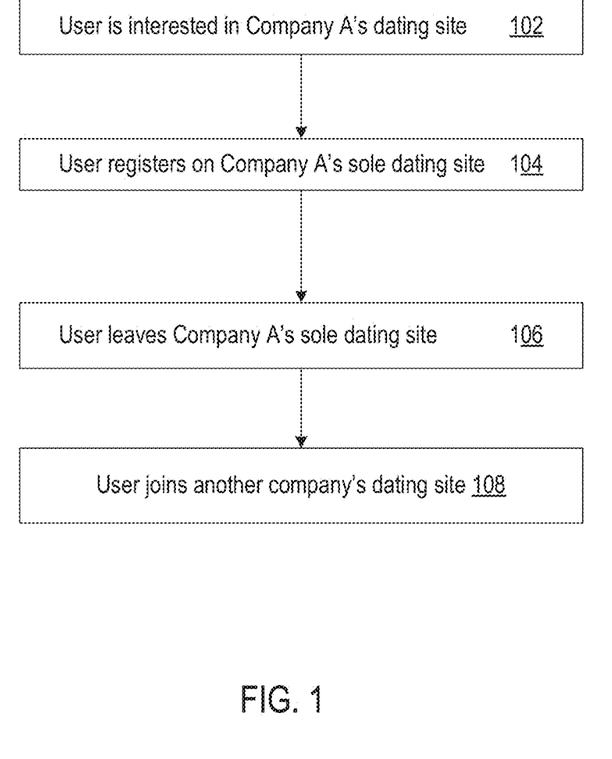
FIG. 1 illustrates the problems with online dating sites.

FIG. 1 shows one of the problems with online dating sites. At block 102, a user is interested in Company A's dating site. At block 104, the user registers at Company A's dating site. The problem is that Company A has only one dating site. At block 106, the user ceases to use Company A's dating site as is quite often the case because the user loses interest in that particular site. At block 108, the user looks for another company that has a dating site and registers at another company's dating site. Thus, the problem is that Company A has lost the patronage of the user. This problem applies to other types of online businesses that have a high churn rate.

DETAILED DESCRIPTION

According to certain embodiments, an online business comprises a portfolio of different types of related sites. Thus a user of the online business can enjoy easy co-registration at one or more of the related sites in the portfolio, cross mailing, and data transfer between sites in the portfolio. For example, in the case of an online dating service, its online dating system comprises a portfolio of different types of dating sites. As non-limiting examples, according to certain embodiments, the different types of dating sites in an online dating system portfolio can include one or more casual dating sites, one or more mainstream dating sites, and one or more niche dating sites. According to certain aspects of the embodiment, a user of the dating system can enjoy easy co-registration at one or more of the dating sites in the portfolio, cross mailing, and data transfer between sites in the portfolio, as explained in greater detail herein. While an online dating system is described herein, the embodiments of the invention are not limited to dating systems and can apply to other types of online businesses that have a high churn rate in its membership. Non-limiting examples of other types of online businesses for which the embodiments can be implemented include mobile and social gaming and online gambling.

Figure 2:
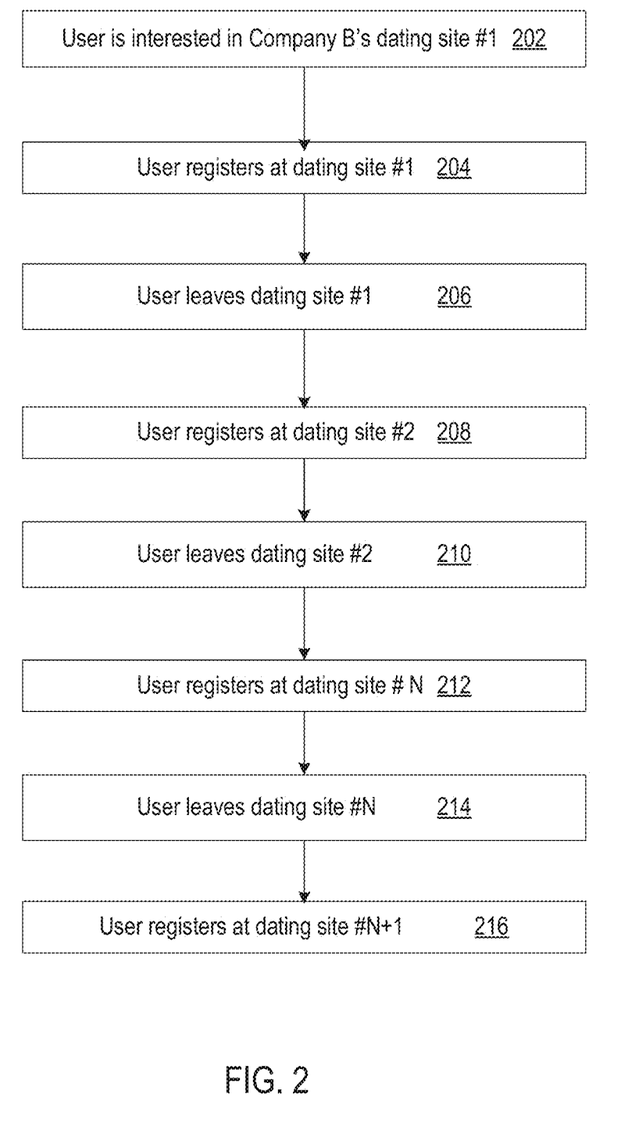
FIG. 2 illustrates aspects of an online dating system that comprises a portfolio of different types of dating sites, according to certain embodiments.

According to certain embodiments, FIG. 2 illustrates aspects of an online dating system that comprises a portfolio of different types of dating sites. For purposes of explanation, assume that Company B is associated with an online dating system that comprises a portfolio of several dating sites 1 to N+1, where N is a positive integer.

In FIG. 2, at block 202, a user is interested in Company B's dating site #1. At block 204, the user registers on Company B's dating site #1. At block 206, assume that the user loses interest in Company B's dating site #1 and leaves site #1 either by ceasing to use site #1 all together or uses it infrequently. However, at block 208, the user can automatically register using various schemes as described in greater detail herein at Company B's dating site #2 and thus the user remains with Company B rather than shifting his/her patronage to another company. Similarly, at block 210, assume that the user loses interest in Company B's dating site #2 and leaves site #2 either by ceasing to use site #1 all together or uses it infrequently. However, at block 212, the user can automatically register using various schemes as described in greater detail herein at Company B's dating site #N and thus the user remains with Company B rather than shifting his/her patronage to another company, where N is a positive integer greater than 1. Again, at block 214, assume that the user loses interest in Company B's dating site #N and leaves site #N either by ceasing to use site #N all together or uses it infrequently. However, at block 216, the user can automatically register at Company B's dating site #N+1 and thus the user remains with Company B rather than shifting his/her patronage to another company. Thus, by having a portfolio of multiple online dating sites of different types, Company B can keep the interest of the user for a longer period.

Figure 3:
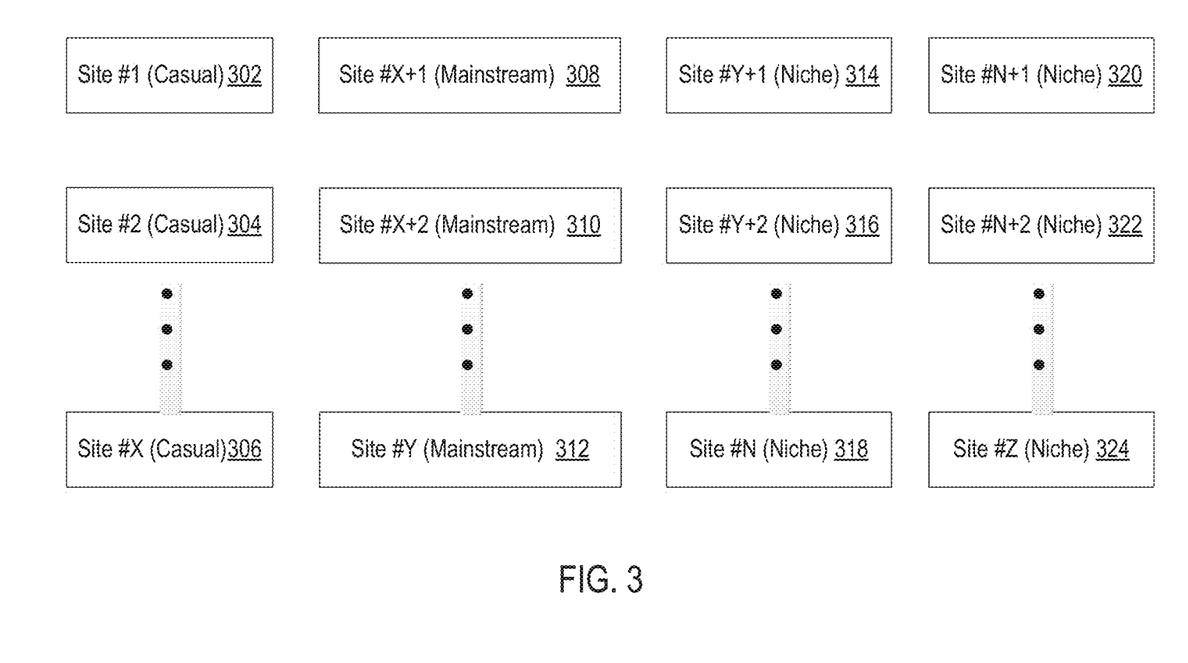
FIG. 3 illustrates a sample portfolio of different types of online dating sites, according to certain embodiments.

FIG. 3 illustrates a sample portfolio of different types of online dating sites that a given company can use so as to increase the likelihood of retaining the interest of a user, according to certain embodiments. For example, assume Company C has a sample portfolio that includes several casual online dating sites, several mainstream online dating sites, and several niche online dating sites. According to certain embodiments, the dating system enables a user to automatically register at any dating site in the portfolio. FIG. 3 shows: casual online dating sites such as site #1 (302), site #2 (304) to site #X (306); mainstream online dating sites such as site #X+1 (308), site #X+2 (310) to site #Y (312); and several niche online dating sites such as site #Y+1 (314), site #Y+2 (316), . . . site #N (318), site #N+1 (320), site #N+2 (322) . . . site #Z (324), where X, Y, Z and N are positive integers. Thus, a user can co-register at several sites in the portfolio should the user so desire and thus remain loyal to Company C. Even though FIG. 3 shows types of dating sites to be "casual", "mainstream" and "niche", the embodiments are not restricted to these types of dating sites. The types of dating sites may vary from implementation to implementation. Further, the portfolio of dating sites may include any combination of types of dating sites and may vary from implementation to implementation. According to certain embodiments, casual dating sites are sites where members are seeking fun and flirtation. Mainstream dating sites are sites where members are seeking long term relationships, and niche dating sites are sites where members have specific criteria such as age, gender, ethnicity, national origin, hobbies, preferences, income, etc., and may vary from implementation to implementation.

Figure 4:
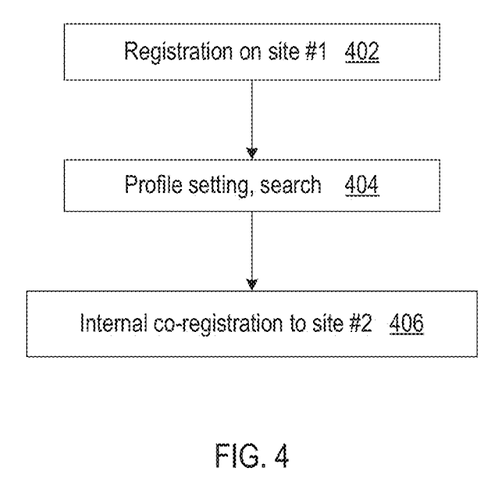
FIG. 4 illustrates the co-registration feature of the dating system that comprises a portfolio of different types of dating sites, according to certain embodiments.

FIG. 4 illustrates the co-registration feature of the dating system that comprises a portfolio of different types of dating sites, according to certain embodiments. For purposes of explanation assume that Company C has an online dating system that comprises a portfolio of different types of dating sites and FIG. 4 will be explained with reference to Company C. In FIG. 4, at block 402 a user registers at dating site #1 of Company C. At block 404, the user sets his/her profile and uses the dating site such as performing searches for suitable dating partners. According to certain embodiments, on site #1, there is information to allow the user to co-register at one or more other dating sites in the portfolio of different types of dating sites associated with Company C. At block 406, the user co-registers at another dating site in the portfolio should she/he so desires. According to certain embodiments, the user does not have to resubmit her/his profile information and other registration details for any co-registration at other dating sites in the portfolio.

Figure 5:
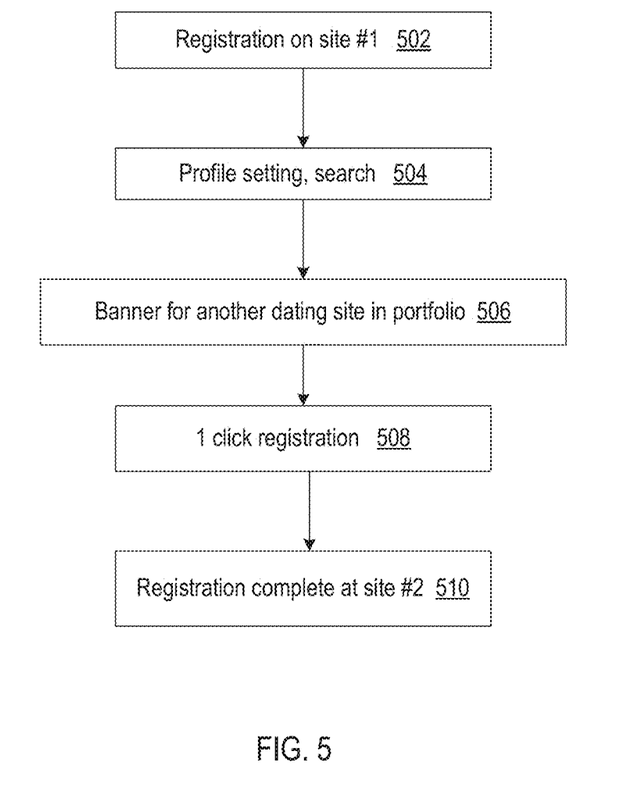
FIG. 5 illustrates the "banner 1-click registration" feature of the dating system that comprises a portfolio of different types of dating sites according to certain embodiments.

FIG. 5 illustrates the "banner 1-click registration" feature of the dating system that comprises a portfolio of different types of dating sites according to certain embodiments. One or more computer modules and devices may be used to enable the "banner 1-click registration" feature of the dating system. For purposes of explanation assume that Company C has an online dating system that comprises a portfolio of different types of dating sites and FIG. 5 will be explained with reference to Company C. At block 502, a user registers at dating site #1 of Company C. At block 504, the user sets his/her profile and uses the dating site such as performing searches for suitable dating partners. According to certain embodiments, at block 506, after a predetermined number of days since the user's registration at site #1, the dating system sends to the user on site #1 a banner advertising another dating site (e.g. Site #2) in the portfolio. According to certain embodiments, if the user is interested in registering at site #1, then at block 508, the user need only click on the banner and is automatically registered (block 510) at site #2. According to certain embodiments, the user does not have to resubmit her/his profile information and other registration details for registering at site #2. However, the user has the option of changing her/his profile information and other registration details at site #2 if the user so desires.

Figure 6:
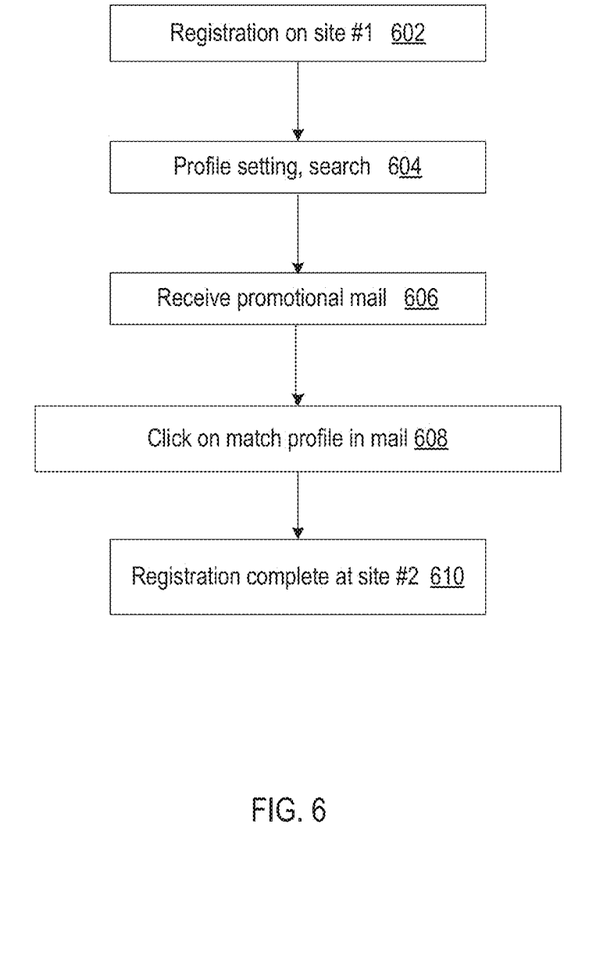
FIG. 6 illustrates the "promotional mail" feature also known as "cross mailing" of the dating system that comprises a portfolio of different types of dating sites, according to certain embodiments.

FIG. 6 illustrates the "promotional mail" feature also known as "cross mailing" of the dating system that comprises a portfolio of different types of dating sites, according to certain embodiments. One or more computer modules and devices may be used to enable the "promotional mail" feature of the dating system. For purposes of explanation assume that Company C has an online dating system that comprises a portfolio of different types of dating sites and FIG. 6 will be explained with reference to Company C. At block 602, a user registers at dating site #1 of Company C. At block 604, the user sets his/her profile and uses the dating site such as performing searches for suitable dating partners. According to certain embodiments, at block 606, after a predetermined number of days since the user's registration at site #1, the dating system sends to the user on site #1 promotional mail featuring profiles of potential dating candidates that might be of interest to the user. Such dating candidates are from other dating sites (e.g., Site #2, Site #3, etc.) in the portfolio. According to certain embodiments, if the user is interested in one of the dating candidates, then at block 608, the user can click on the profile of the dating candidate of interest and is automatically registered at the dating site where the dating candidate of interest is registered, e.g., site #2 (block 610). According to certain embodiments, the user does not have to resubmit her/his profile information and other registration details for registering at site #2. However, the user has the option of changing her/his profile information and other registration details at site #2 if the user so desires. According to certain embodiments, thereafter the dating system sends the user promotional mails periodically, for example, every 2 or 3 days.

Figure 7:
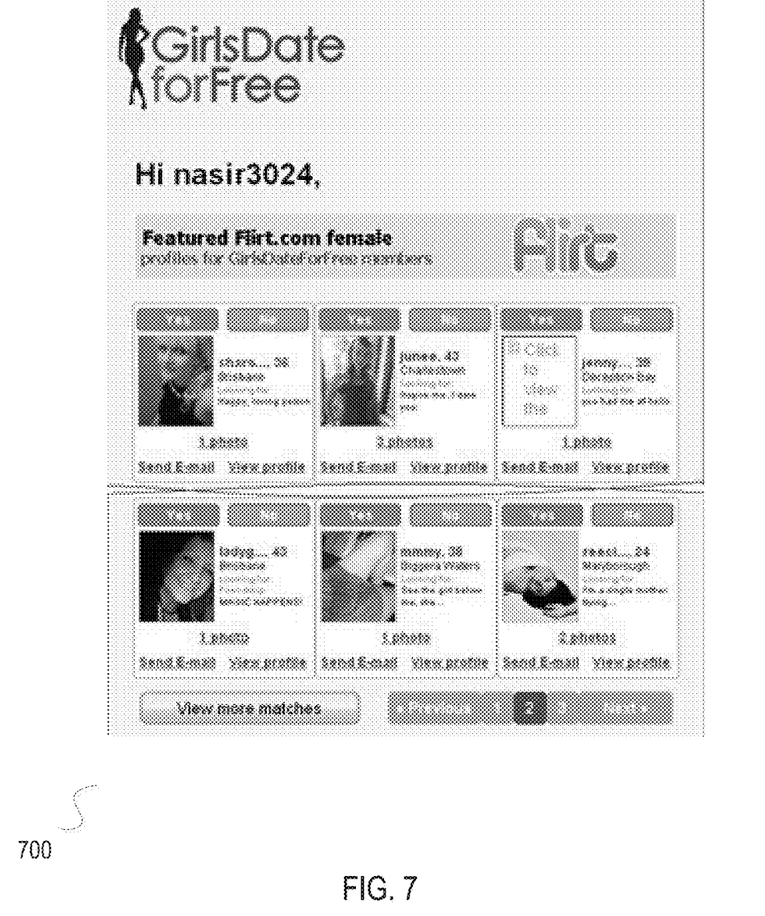
FIG. 7 shows a sample a promotional mail, according to certain embodiments.

FIG. 7 shows a sample a promotional mail, according to certain embodiments. FIG. 7 shows promotional mail 700 featuring profiles of potential dating candidates that might be of interest to the user.

Figure 8:
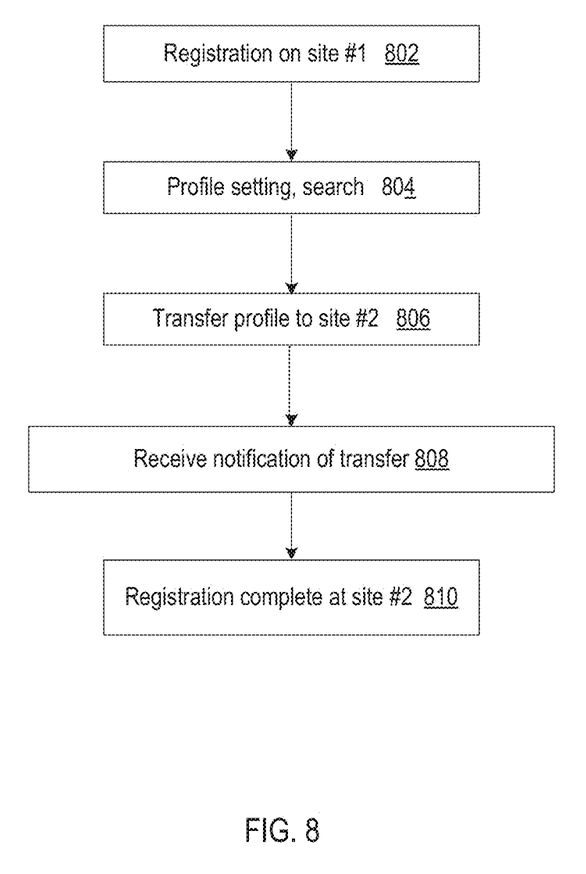
FIG. 8 illustrates the "transfer profile" feature of the dating system that comprises a portfolio of different types of dating sites, according to certain embodiments.

FIG. 8 illustrates the "transfer profile" feature of the dating system that comprises a portfolio of different types of dating sites, according to certain embodiments. One or more computer modules and devices may be used to enable the "transfer profile" feature of the dating system. For purposes of explanation assume that Company C has an online dating system that comprises a portfolio of different types of dating sites and FIG. 8 will be explained with reference to Company C. At block 802, a user registers at dating site #1 of Company C. At block 804, the user sets his/her profile and uses the dating site such as performing searches for suitable dating partners. According to certain embodiments, at block 806, after a predetermined number of days since the user's registration at site #1, the dating system transfers the user's profile information and other registration information to another dating site (e.g., Site #2) in the portfolio. According to certain embodiments, at block 808, the user receives notification of the transfer. The user has the option of cancelling such a transfer or accepting the transfer. If the user accepts the transfer, then at block 810, the user is automatically registered at site #2. According to certain embodiments, the user does not have to resubmit her/his profile information and other registration details for registering at site #2. However, the user has the option of changing her/his profile information and other registration details at site #2 if the user so desires.

Figure 9:
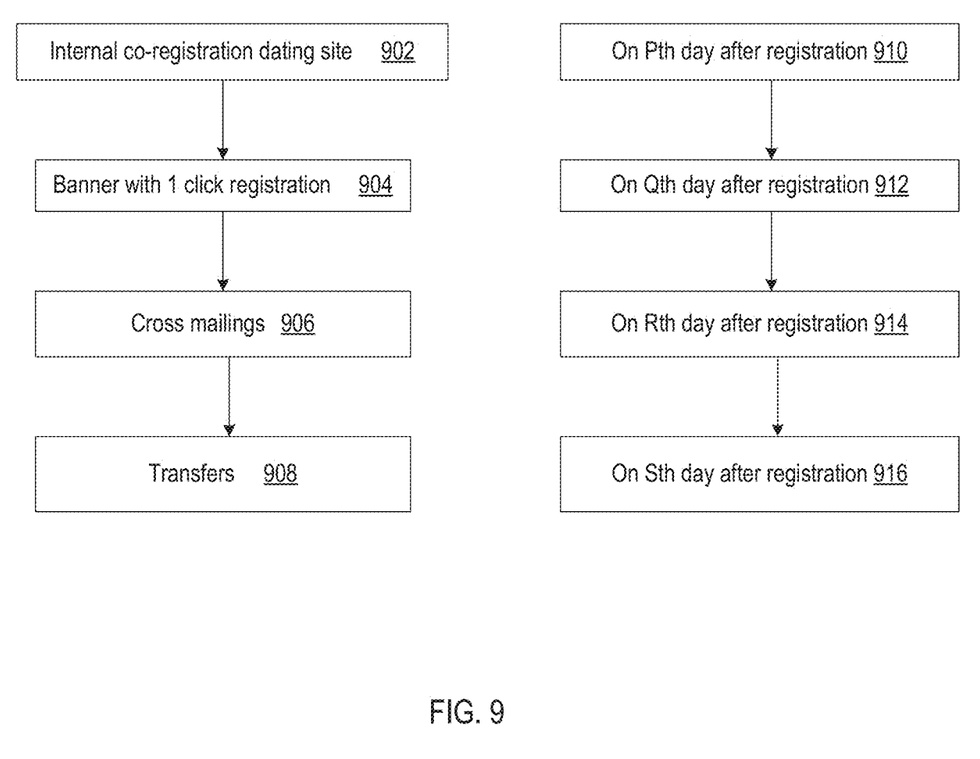
FIG. 9 illustrates some features and accompanying life cycle of the online dating system that comprises a portfolio of different types of dating sites, according to certain embodiments.

FIG. 9 illustrates some features and accompanying life cycle of the online dating system that comprises a portfolio of different types of dating sites, according to certain embodiments. As explained herein, the various features include co-registration 902, banner click registration 904 at one or more of the dating sites in the portfolio, cross mailing 906, and data transfers 908 between sites in the portfolio. The user can co-register at another site in the portfolio on the same day or on the Pth day after registration at the first site, where P is a positive integer. For example, the user can co-register at another site in the portfolio on the first day or second day after registration at the first site. On the Qth day after the user has registered on site #1, the dating system sends to the user on site #1 a banner advertising another dating site (e.g. Site #2) in the portfolio, where Q is a positive integer. For example, Q may be the $3^{rd}$ day after the user has registered on site #1. On the Rth day after the user has registered on site #1, the dating system sends to the user on site #1 promotional mail featuring profiles of potential dating candidates that may be of interest to the user, where R is a positive integer. For example, R may be the $7^{th}$ day after the user has registered on site #1. On the Sth day after the user has registered on site #1, the dating system transfers the user's profile information and other registration information to another dating site (e.g. Site #2) in the portfolio, where S is a positive integer. For example, S may be the 30$^{th}$ day after the user has registered on site #1.

According to certain embodiments, the dating system analyzes the user's data when selecting a dating site from the portfolio to send to the user via the "banner 1-click registration" feature, or the "promotional mail" feature or, the "transfer profile" feature. For example, the dating system may consider the attributes related to user's profile such as age, gender, ethnicity, marital status, hobbies, level of income, etc. As a non-limiting example, if user is 40+ in age and registered at mainstream dating site #1, the dating system might suggest niche dating site #2 users over 40. As a non-limiting example, one or more rules engine and associated databases are used for analyzing and storing user data.

The online data system may be a distributed computing system that comprises one or more servers and may employ distributed processes. The servers may be coupled to a communications network via a network communication module, for example. The communications network may be the Internet, but may also be any local area network (LAN) and/or wide area network (WAN). In some embodiments, one or more servers are Web servers that manage a portfolio of online dating sites. Alternatively, if servers are used within an intranet, such may be intranet servers. The dating system may include high speed random access memory and may also include non-volatile memory, such as one or more magnetic or optical disk storage devices. The memory may optionally include one or more storage devices remotely located from the CPU(s) of the dating system. In some embodiments, the memory stores a subset or superset of the programs, modules and data structures associated with managing the portfolio of online dating sites.

According to certain embodiments, the dating system may select a dating site from the portfolio to send to the user based on a revenue model such as an "Effective CPM" (ECPM). The ECPM is calculated as revenue for 1000 impressions of promotional materials, for example. The dating system first selects from sites with higher ECPMs. For example, if site #X has a higher ECPM than site #Y, then the dating system may select site #X before selecting site #Y for proposing to the user via the "banner 1-click registration" feature, or the "promotional mail" feature or, the "transfer profile" feature.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A system, comprising:
    at least one server computer including computer program code for managing a portfolio of multiple online dating sites over a communication network, the portfolio of multiple online dating sites being operated by a single business entity, the multiple online dating sites including at least one casual dating site, at least one mainstream dating site, and a plurality of niche dating sites, a particular user being registered with at least one particular online dating site of the multiple online dating sites, each of multiple online dating sites being distinct from the computer program code, and each of the multiple online dating sites being distinct from each other;
    at least one computer rules engine of the at least one particular online dating site of the multiple online dating sites configured to:
        store profile information of the particular user;
        store dating-partner preferences of the particular user, the dating-partner preferences including dating-partner search request information obtained from search requests submitted by the particular user at the at least one particular online dating site; and
        execute one or more rules to use the profile information and the dating-partner preferences of the particular user to select one of several advertisement types for recommending to the particular user one or more other online dating sites of the multiple online dating sites in the portfolio, a first advertisement type of the several advertisement types including recommending to the particular user, on the at least one particular online dating site on which the particular user is registered, one or more dating-partner candidates that matches the dating-partner preferences of the particular user, wherein the one or more recommended dating-partner candidates is registered at the one or more other online dating sites of the multiple online dating sites in the portfolio, a second advertisement type of the several advertisement types including recommending, to the particular user, on the at least one particular online dating site on which the particular user is registered, particular niche dating sites of the plurality of niche dating sites; and
    at least one module of the at least one server computer configured to:
        receive, from the particular user, a selection of a particular recommended dating-partner candidate of the one or more recommended dating-partner candidates recommended to the particular user on the at least one particular online dating site on which the particular user is registered and, based on the selection, automatically register the particular user at a particular other online dating site associated with the selected dating-partner candidate, the automatic registration of the particular user at the particular other online dating site including automatic transfer of the profile information and the dating-partner preferences of the particular user from the at least one particular online dating site on which the particular user is registered to the particular other online dating site over the communication network; and
        receive, from the particular user, a selection of a particular niche dating site of the recommended particular niche dating sites recommended to the particular user on the at least one particular online dating site on which the particular user is registered and, based on the selection, automatically register the particular user at the particular niche dating site, the automatic registration of the particular user at the particular niche dating site including automatic transfer of the profile information and the dating-partner preferences of the particular user from the at least one particular online dating site on which the particular user is registered to the particular niche dating site over the communication network.

2. The online dating system of claim 1, further comprising a different user interface for each online dating site in the portfolio.

3. The online dating system of claim 1, further comprising at least one co-registration module to allow the particular user to automatically co-register at a second particular online dating site in the portfolio.

4. The online dating system of claim 1, further comprising at least one banner click registration module to allow the particular user to automatically register at a second particular online dating site in the portfolio by clicking on a banner associated with the second particular online dating site in the portfolio.

5. The online dating system of claim 1, further comprising at least one cross mailing registration module to allow the particular user to automatically register at a second particular online dating site in the portfolio by selecting a profile associated with a cross mailing.

6. The online dating system of claim 1, further comprising a computer module for calculating a revenue model for each online dating site in the portfolio.

7. The online dating system of claim 6, wherein the at least one computer rules engine is configured to use results from the calculated revenue models for each online dating site in the portfolio for recommending a second particular online dating site to the particular user.

8. A computer method for managing multiple online dating sites, the method comprising:
managing a portfolio of multiple online dating sites over a communication network, the portfolio of multiple online dating sites being operated by a single business entity, the multiple online dating sites including at least one casual dating site, at least one mainstream dating site, and a plurality of niche dating sites, a particular user being registered with at least one particular online dating site of the multiple online dating sites, each of multiple on line dating sites being distinct from the computer program code, and each of the multiple online dating sites being distinct from each other;
storing, by the at least one particular online dating site of the multiple online dating-sites, profile information of the particular user;
storing, by the at least one particular online dating site of the multiple online dating sites, dating-partner preferences of the particular user, the dating-partner preferences including dating-partner search request information obtained from search requests submitted by the particular user at the at least one particular online dating site;
executing, by the at least one particular online dating site of the multiple online dating sites, one or more rules to use the profile information and the dating-partner preferences of the particular user to select one of several advertisement types for recommending to the particular user one or more other online dating sites of the multiple online dating sites in the portfolio, a first advertisement type of the several advertisement types including recommending to the particular user, on the at least one particular online dating site on which the particular user is registered, one or more dating-partner candidates that matches the dating-partner preferences of the particular user, wherein the one or more recommended dating-partner candidates is registered at one or more other online dating sites of the multiple online dating sites in the portfolio, a second advertisement type of the several advertisement types including recommending, to the particular user, on the at least one particular online dating site on which the particular user is registered, particular niche dating sites of the plurality of niche dating sites;
receiving, from the particular user, a selection of a particular recommended dating-partner candidate of the one or more recommended dating-partner candidates recommended to the particular user on the at least one particular online dating site on which the particular user is registered and, based on the selection, automatically register, by at least one module of the at least one server computer, the particular user at a particular other online dating site associated with the selected dating-partner candidate, the automatic registration of the particular user at the particular other online dating site including automatic transfer of the profile information and the dating-partner preferences of the particular user from the at least one particular online dating site on which the particular user is registered to the particular other online dating site over the communication network; and
receiving, from the particular user, a selection of a particular niche dating site of the recommended niche dating sites recommended to the particular user on the at least one particular online dating site on which the particular user is registered and, based on the selection, automatically register, by the at least one module of the at least one server computer, the particular user at the particular niche dating site, the automatic registration of the particular user at the particular niche dating site including automatically transfer of the profile information and the dating-partner preferences of the particular user from the at least one particular online dating site on which the particular user is registered to the particular niche dating site, over the communication network.

9. The computer method of claim 8, further comprising using a different user interface for each online dating site in the portfolio.

10. The computer method of claim 8, further comprising enabling the particular user to automatically co-register at a second particular online dating site in the portfolio.

11. The computer method of claim 8, further comprising enabling the particular user to automatically register at a second particular online dating site in the portfolio by clicking on a banner associated with the second particular online dating site in the portfolio.

12. The computer method of claim 8, further comprising enabling the particular user to automatically register at a second particular online dating site in the portfolio by selecting a profile associated with a cross mailing.

13. The computer method of claim 8, further comprising calculating a revenue model for each online dating site in the portfolio.

14. The computer method of claim 13, further comprising using results from the calculated revenue models for each online dating site in the portfolio for recommending a second particular online dating site to the particular user.

* * * * *